US009762271B2

(12) United States Patent
Li

(10) Patent No.: US 9,762,271 B2
(45) Date of Patent: Sep. 12, 2017

(54) METHOD FOR ADJUSTING LO FREQUENCIES IN RECEIVER AND ASSOCIATED RECEIVER

(71) Applicant: Telefonaktiebolaget LM Ericsson (publ), Stockholm (SE)

(72) Inventor: Ming Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/109,599

(22) PCT Filed: Jan. 3, 2014

(86) PCT No.: PCT/CN2014/070069
§ 371 (c)(1),
(2) Date: Jul. 1, 2016

(87) PCT Pub. No.: WO2015/100725
PCT Pub. Date: Jul. 9, 2015

(65) Prior Publication Data
US 2016/0329920 A1 Nov. 10, 2016

(51) Int. Cl.
*H04B 1/38* (2015.01)
*G01S 5/02* (2010.01)
(Continued)

(52) U.S. Cl.
CPC ......... *H04B 1/1027* (2013.01); *H04B 1/0007* (2013.01); *H04B 1/30* (2013.01);
(Continued)

(58) Field of Classification Search
CPC ........ H04B 1/123; H04B 1/0475; H04B 1/40; H04B 1/44; H04B 1/0458; H04B 1/1018; H04B 15/005; H04B 17/318
(Continued)

(56) References Cited

U.S. PATENT DOCUMENTS 6,081,301 A * 6/2000 Limberg ................ H04N 5/211
348/607
6,463,266 B1 * 10/2002 Shohara .................... H03J 7/04
375/219

(Continued)

FOREIGN PATENT DOCUMENTS

CN 102377493 A 3/2012
CN 103368589 A 10/2013
(Continued)

*Primary Examiner* — Daniel Washburn
*Assistant Examiner* — Sarah Hassan
(74) *Attorney, Agent, or Firm* — Murphy, Bilak & Homiller, PLLC

(57) ABSTRACT

The present disclosure discloses a method for adjusting one or more LO frequencies in a receiver. The receiver performs down conversion on a received signal through one or more mixers by using the one or more LO frequencies, and outputs one or more symbols through an ADC. The method comprising the steps of: for each of the one or more LO frequencies, estimating a new LO frequency corresponding to a best signal quality of the received signal; and adjusting the LO frequency into the new LO frequency. The present disclosure also relates to a receiver for adjusting one or more LO frequencies.

10 Claims, 16 Drawing Sheets

(51) Int. Cl.
*H04B 1/10* (2006.01)
*H04B 15/00* (2006.01)
*H04B 1/525* (2015.01)
*H04B 17/336* (2015.01)
*H04B 1/00* (2006.01)
*H04B 1/30* (2006.01)
*H04L 27/26* (2006.01)

(52) U.S. Cl.
CPC ........... *H04B 1/525* (2013.01); *H04B 15/005* (2013.01); *H04B 17/336* (2015.01); *H04L 27/265* (2013.01); *H04B 2001/1072* (2013.01); *H04B 2001/307* (2013.01)

(58) Field of Classification Search
USPC .......................................... 375/219; 342/417
See application file for complete search history.

(56) References Cited

U.S. PATENT DOCUMENTS

| | | | | |
|---|---|---|---|---|
| 6,700,536 B1* | 3/2004 | Wiegand | ................. | G01S 3/023 342/417 |
| 6,904,266 B1* | 6/2005 | Jin | ..................... | H04B 7/15571 370/279 |
| 7,155,196 B1 | 12/2006 | Beard et al. | | |
| 2001/0015963 A1* | 8/2001 | Tuomainen | ....... | H04W 52/0216 370/311 |
| 2001/0040878 A1* | 11/2001 | Schilling | .............. | H04B 7/2628 370/329 |
| 2002/0047942 A1* | 4/2002 | Vorenkamp | ............ | H04N 5/455 348/731 |
| 2003/0002452 A1* | 1/2003 | Sahota | ................... | H04B 17/13 370/318 |
| 2004/0090234 A1* | 5/2004 | Macune | ................... | G01V 3/30 324/337 |
| 2005/0003785 A1* | 1/2005 | Jackson | .................... | G01S 7/35 455/260 |
| 2005/0181729 A1* | 8/2005 | Ibrahim | ................... | H03J 7/02 455/41.2 |
| 2010/0045388 A1 | 2/2010 | Xu et al. | | |
| 2011/0117870 A1 | 5/2011 | Pera et al. | | |
| 2011/0171919 A1 | 7/2011 | Tryhub et al. | | |
| 2012/0313680 A1 | 12/2012 | Kodama et al. | | |

FOREIGN PATENT DOCUMENTS

| | | |
|---|---|---|
| EP | 2391023 A1 | 11/2011 |
| GB | 2304000 A | 3/1997 |
| WO | 9731425 A1 | 8/1997 |

* cited by examiner

METHOD FOR ADJUSTING LO FREQUENCIES IN RECEIVER AND ASSOCIATED RECEIVER

TECHNICAL FIELD

The present disclosure generally relates to data processing at a receiving end in the communication field, and particularly, to a method for adjusting one or more Local Oscillator (LO) frequencies in a receiver, and an associated receiver.

BACKGROUND

A heterodyne receiver, with either double down conversion or single down conversion, is widely used in a base station, a User Equipment (UE), or the like communication systems. At an Antenna Reference Point (ARP) of such a receiver, a received spectrum is densely occupied with both transmit and receive bands of various communication standards, such as Universal Mobile Telecommunications System (UMTS), Long-Term Evolution (LTE) or Advanced LTE (LTE-A). A band select filter attempts to allow only a spectrum, in which users of a particular standard are allowed to communicate to pass and attenuate all other standards and out-of-band interferences. The filtered signal is then amplified by a Low Noise Amplifier (LNA) to suppress contribution of noise from succeeding stages. The receive band is fairly wide with the desired channel embedded within interfering signals and its image. Therefore, the subsequent proceeding stages attempt to isolate the channel of interest while maintaining linearity and system performance.

FIGS. 1a and 1b respectively illustrate structures for a typical double down conversion heterodyne receiver and a typical single down conversion heterodyne receiver.

As show in FIG. 1a, for the double down conversion heterodyne receiver, the first mixing stage places an Intermediate Frequency (IF) at a higher frequency allowing maximal image suppression while the second mixing stage optimizes channel filtering. LOs for the first mixing stage and the second mixing stage are referred to as RF (Radio Frequency) LO and IF LO, respectively. Finally, an anti-aliasing filter with a sharp cutoff is required to reduce RF/IF harmonics. As shown in FIG. 1b, the single down conversion heterodyne receiver has only one stage IF and relative filtering.

The traditional receiver, such as those illustrated in FIG. 1a and FIG. 1b, only supports a single carrier, i.e., a single standard. It uses a narrow IF filter with high selectivity at a fixed frequency, thereby simplifying a design of the receiver. Characteristics of the IF filter are normally selected to match narrow channel requirements, such as channel bandwidth, filter skirt steepness, etc.

With the development of the mobile communications, a base station with multiple carriers will allow a module to be configured with multi-carriers.

For such a receiver, the whole available bandwidth is full band, and the physical bandwidth of an IF filter or an anti-alias filter must also be equal to or larger than the available bandwidth. But for most of the base stations, they maybe use portion of full available bandwidth, for example only one 20 MHz LTE carrier for previous full band (60 MHz) receiver, and only this used 20 MHz is the desired channel.

Moreover, there is a very common situation that an operator only has license of 20 MHz frequency band, but operates with full band (60 MHz) receiver hardware.

FIG. 2 shows relationship between UL band, receiver available bandwidth and the desired channel. Here, assume that the maximum received signal available bandwidth is 60 MHz, and a total design bandwidth of an IF filter and an anti-alias filter is also 60 MHz, as shown in the upper figure of FIG. 2.

In the current IF configuration, at a receiving end, there is not extra consideration for a signal frequency allocation when a bandwidth of the desired channel is less than the available bandwidth. A default configuration sets a signal frequency at the center of the IF filter.

As shown in the lower figure of FIG. 2, a received desired channel of 20 MHz is rather less than the available bandwidth of 60 MHz. Normally, there are two 20 MHz free spaces respectively around dual sides of the received signal channel of 20 MHz. For the current LO configuration, if any interference falls in the total 2*20 MHz in band of the IF filter bandwidth, the interference will not be attenuated by an analog part of the receiver (including the IF filter and the anti-alias filter).

Such a receiving carrier frequency allocation leads to obvious drawbacks that blocking interferences, which are at sides of the received desired channel of 20 MHz but still in the receiver available bandwidth, will arrive at an Analog-to-Digital Converter (ADC) of the receiver without any attenuation.

FIGS. 3a and 3b illustrate direct blocking impact and Third-order Intercept Point (IP3) blocking impact according to the prior art, respectively.

As shown in FIG. 3a, a high-level interference signal from UE B or an in-band interference source enters an available bandwidth of BS A directly. An analog gain of BS A from its antenna to its ADC must be reduced to avoid over-driving ADC, and then a noise figure of a receiver of BS A will go up. As a consequence, the receiver's sensitivity is degraded directly, and in a worst case, BS A can't talk to UE A when it is at the cell edge.

As shown in FIG. 3b, an IP3 product generated by BS A's transmitter leakage (i.e., TX leakage) at f3 and an interference at f2 from UE B or an in-band interference falls into BS A's desired channel at f1 (f3−f2=f2−f1). This also leads to sensitivity degradation for BS A. For example, for a middle range macro base station, assume that BS A's transmission power is 5 W (37 dBm), and after being reasonably suppressed by 75 dB by BS A's duplexer, it is still −38 dBm at a front-end of a receiver. The TX leakage signal of −38 dBm will produce IP3 products in BS A's desired channel when having an interference signal of −13 dBm from UE B. To eliminate/minimize IP3 product degradation for BS A's receiver, receiver IP3 requirement or duplexer rejection needs to be enhanced greatly. This needs high cost components and high power consumption.

SUMMARY

An object of the present disclosure is to disclose a LO frequency adjusting scheme to reduce in-band interference at a receiver.

To achieve the object, according to a first aspect of the present disclosure, there is provided a method for adjusting one or more LO frequencies in a receiver. The receiver performs down conversion on a received signal through one or more mixers by using the one or more LO frequencies, and outputs one or more symbols through an ADC. The method includes the steps of: for each of the one or more LO frequencies: estimating a new LO frequency corresponding to a best signal quality of the received signal; and adjusting the LO frequency into the new LO frequency.

In an embodiment, before the step of adjusting the LO frequency into the new LO frequency, the method further includes: detecting power levels of one or more interferences in the received signal during a predefined time period; and comparing the detected power levels with a first predefined threshold. If the detected power levels are all higher than the first predefined threshold, the LO frequency is adjusted into the new LO frequency.

In an embodiment, before the step of adjusting the LO frequency into the new LO frequency, the method further includes: comparing the detected power levels with a second predefined threshold. The second predefined threshold is lower than the first predefined threshold. If the detected power levels are all lower than the second predefined threshold, the LO frequency is adjusted to an initial value.

In an embodiment, the best signal quality is indicated by a maximum Signal Noise Ratio (SNR) of the received signal.

In an embodiment, the step of estimating the new LO frequency includes: performing Fast Fourier Transform (FFT) on the one or more symbols to obtain a power spectrum chart of the received signal; and obtaining the new LO frequency, at which a maximum SNR occurs, based on the power spectrum chart.

In an embodiment, the step of estimating the new LO frequency comprises: within a search window: decreasing the LO frequency step by step until a first extremum SNR occurs; increasing the LO frequency step by step until a second extremum SNR occurs; and obtaining the new LO frequency corresponding to the higher one of the first extremum SNR and the second extremum SNR.

According to a second aspect of the present disclosure, there is provided a receiver for adjusting one or more LO frequencies. The receiver includes one or more mixers for performing down conversion on a received signal by using the one or more LO frequencies, and an ADC for outputting one or more symbols. The receiver further includes: an estimating unit configured to, for each of the one or more LO frequencies, estimate a new LO frequency corresponding to a best signal quality of the received signal; and an adjusting unit configured to adjust the LO frequency into the new LO frequency.

According to a third aspect of the present disclosure, there is provided a receiver. The receiver includes: one or more mixers configured to perform down conversion on a received signal by using one or more LO frequencies; an ADC configured to output one or more symbols; a processor; and a memory containing instructions which, when executed by said processor, cause said receiver to: for each of the one or more LO frequencies: estimate a new LO frequency corresponding to a best signal quality of the received signal; and adjust the LO frequency into the new LO frequency.

According to a fourth aspect of the present disclosure, there is provided a computer-readable storage medium storing instructions that when executed, cause one or more computing devices to perform the method according to the first aspect of the present disclosure.

According to the present disclosure, the best receiver performance may be gained by dynamically shifting one or more LO frequencies.

BRIEF DESCRIPTION OF THE DRAWINGS

The above and other object, features, and advantages of the present disclosure will become apparent from the following descriptions on embodiments of the present disclosure with reference to the drawings, in which.

DETAILED DESCRIPTION OF THE EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

The present disclosure proposes a LO frequency adjusting scheme, which may monitor and detect real time received power level impacted by interference, estimate the best LO frequency selection to mitigate the RX sensitivity degradation by interference, and perform LO shifting control in accordance with the estimation, in order to allocate an IF frequency at an optimized position in the band of IF filters to attenuate interferences. Herein, the term "LO shifting control" may refer to control a LO to shift its LO frequency.

Figure 1A:
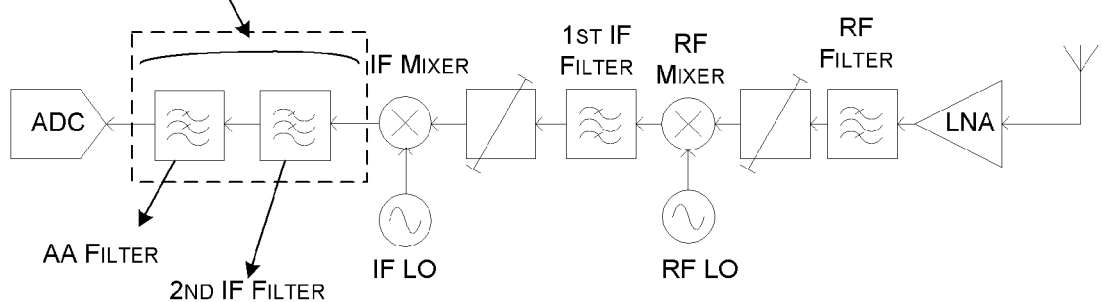
FIG. 1a shows a structure of a typical double down conversion heterodyne receiver.
Figure 1B:
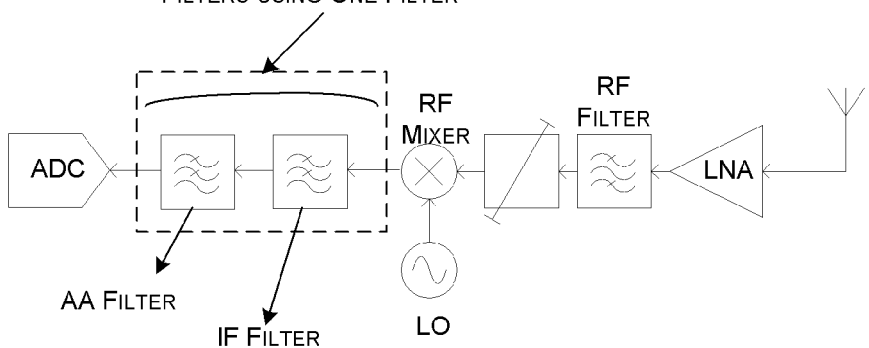
FIG. 1b shows a structure of a typical single down conversion heterodyne receiver.
Figure 2:
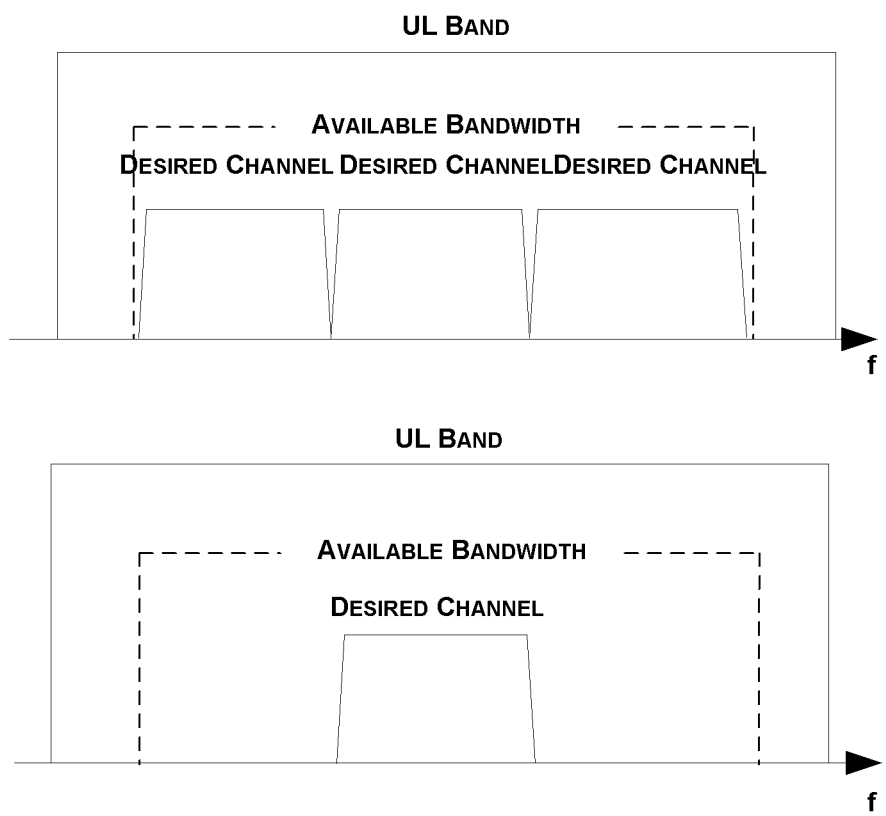
FIG. 2 shows a relationship among a UL band, a receiver available bandwidth and the desired channel.
Figure 3A:
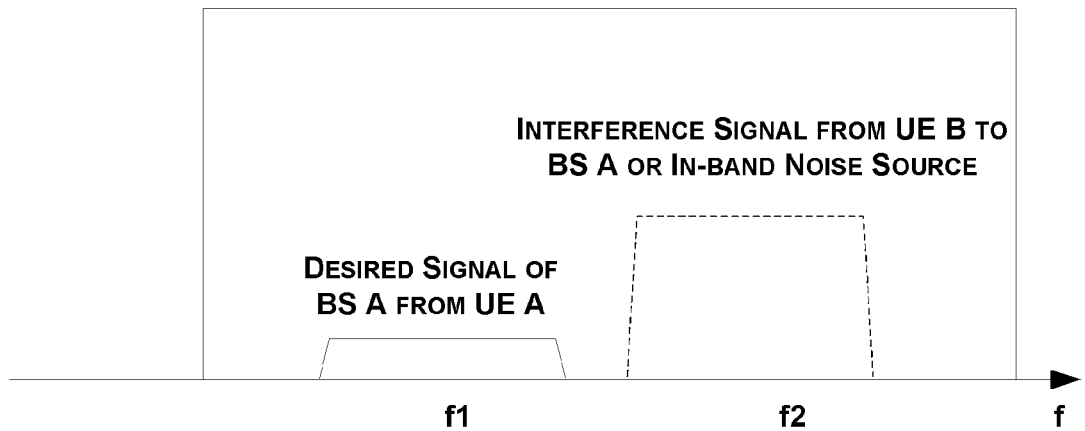
FIG. 3a shows direct blocking impact according to the prior art.
Figure 3B:
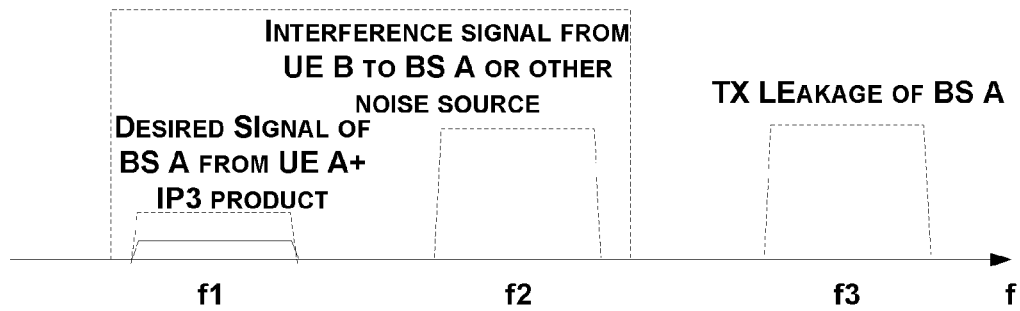
FIG. 3b shows IP3 blocking impact according to the prior art.
Figure 4A:
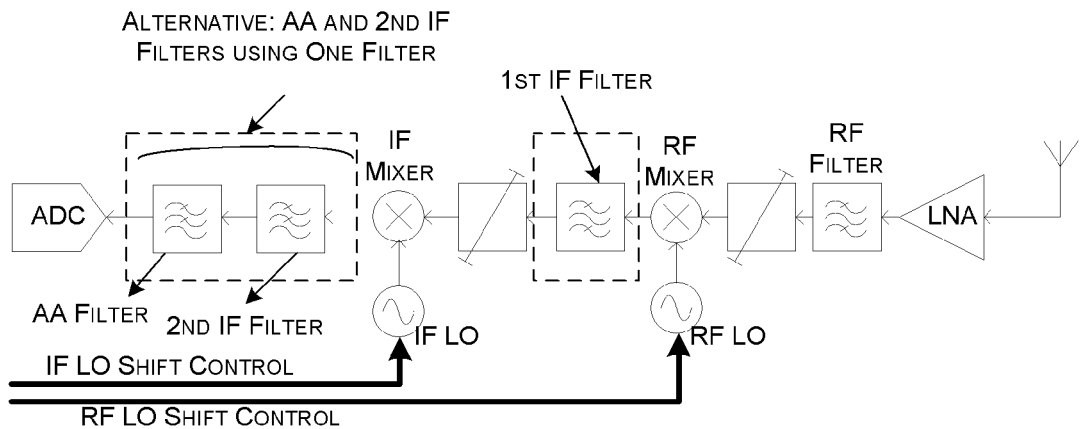
FIG. 4a illustrates a double down conversion heterodyne receiver with LO shifting control according to the present disclosure.

FIG. 4a illustrates a double down conversion heterodyne receiver with LO shifting control according to the present disclosure.

As depicted in FIG. 4a, RF LO and IF LO are controlled to real time update respective LO frequencies via control signals, thereby adjusting corresponding IF frequencies, respectively.

Figure 4B:
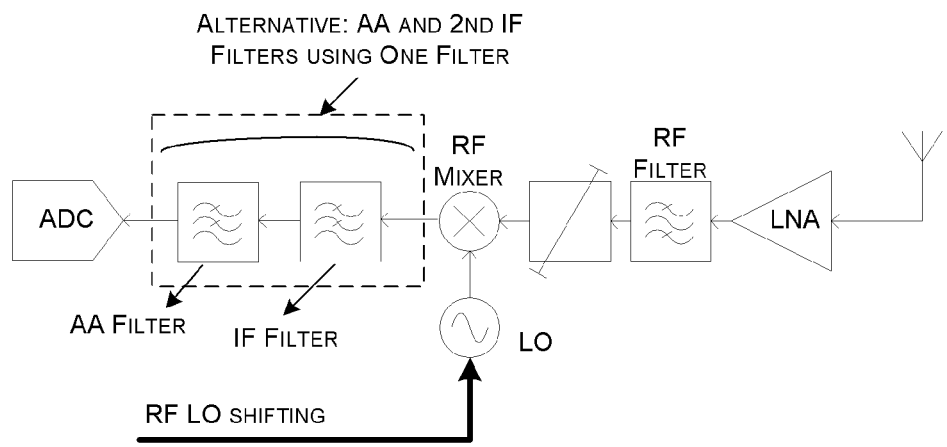
FIG. 4b illustrates a single down conversion heterodyne receiver with LO shifting control according to the present disclosure.

FIG. 4b illustrates a single down conversion heterodyne receiver with LO shifting control according to the present disclosure.

As illustrated in FIG. 4b, RF LO is controlled to real time update its LO frequency via a control signal, thereby adjusting a corresponding IF frequency.

Figure 5:
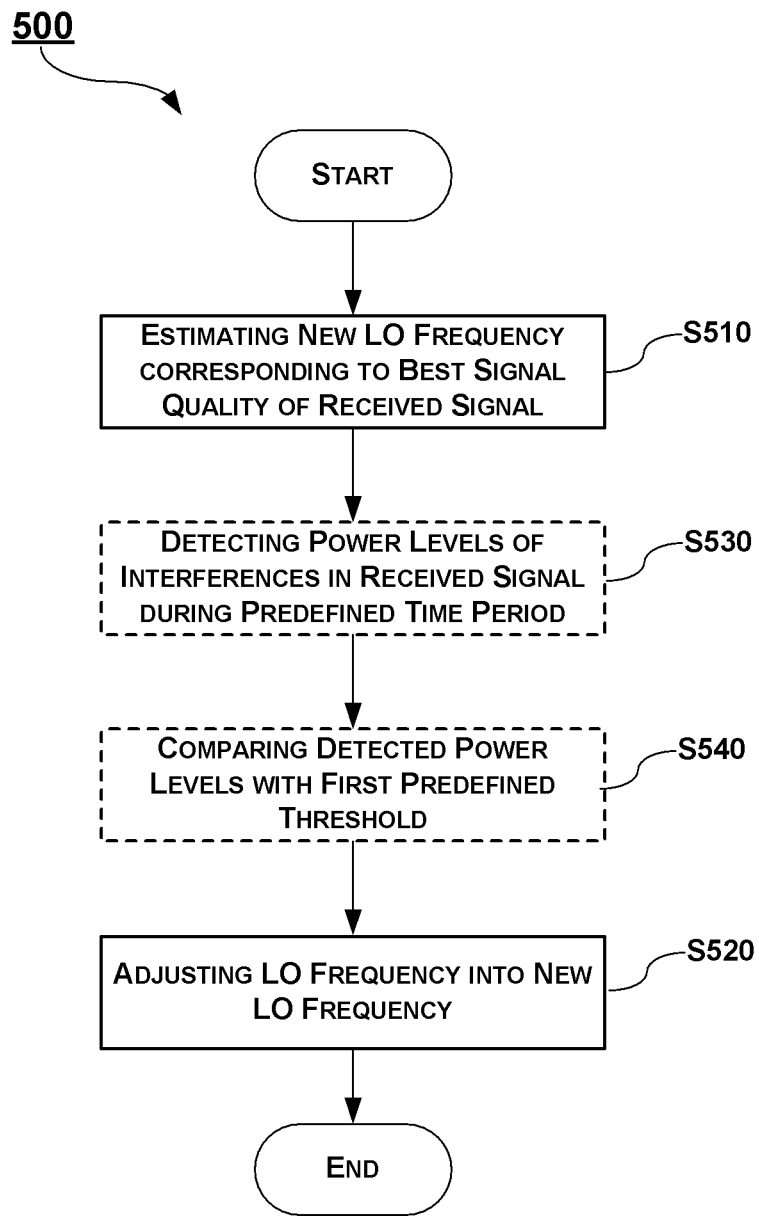
FIG. 5 shows a flowchart of a method 500 for adjusting one or more LO frequencies in a receiver according to some embodiments of the present disclosure.

FIG. 5 shows a flowchart of a method 500 for adjusting one or more LO frequencies in a receiver according to some embodiments of the present disclosure. The receiver performs down conversion on a received signal through one or more mixers by using the one or more LO frequencies, and outputs one or more symbols through an ADC.

Referring to FIG. 5, for each of the one or more LO frequencies, the receiver estimates a new LO frequency corresponding to a best signal quality of the received signal (step S510). For example, the best signal quality may be indicated by a maximum SNR of the received signal. Alternatively, the best signal quality may be also indicated by Signal-to-noise and distortion ratio (SINAD), bit error rate, or bit error ratio (BER).

At step S520, the LO frequency is adjusted into the new LO frequency.

With the method 500, the receiver's IF frequency may be adjusted by dynamically shifting the receiver's LO frequency, so as to remove in-band interference in the received signal as much as possible and thereby obtaining the best performance for the receiver.

Figure 6:
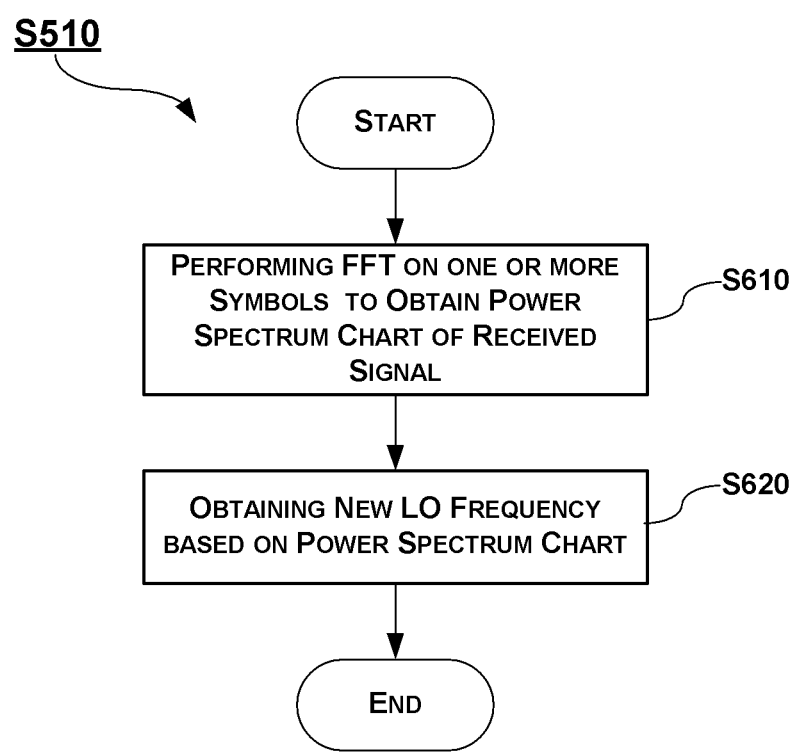
FIGS. 6 and 7 illustrate two feasible manners to implement step S510 of FIG. 5, respectively.
Figure 7:
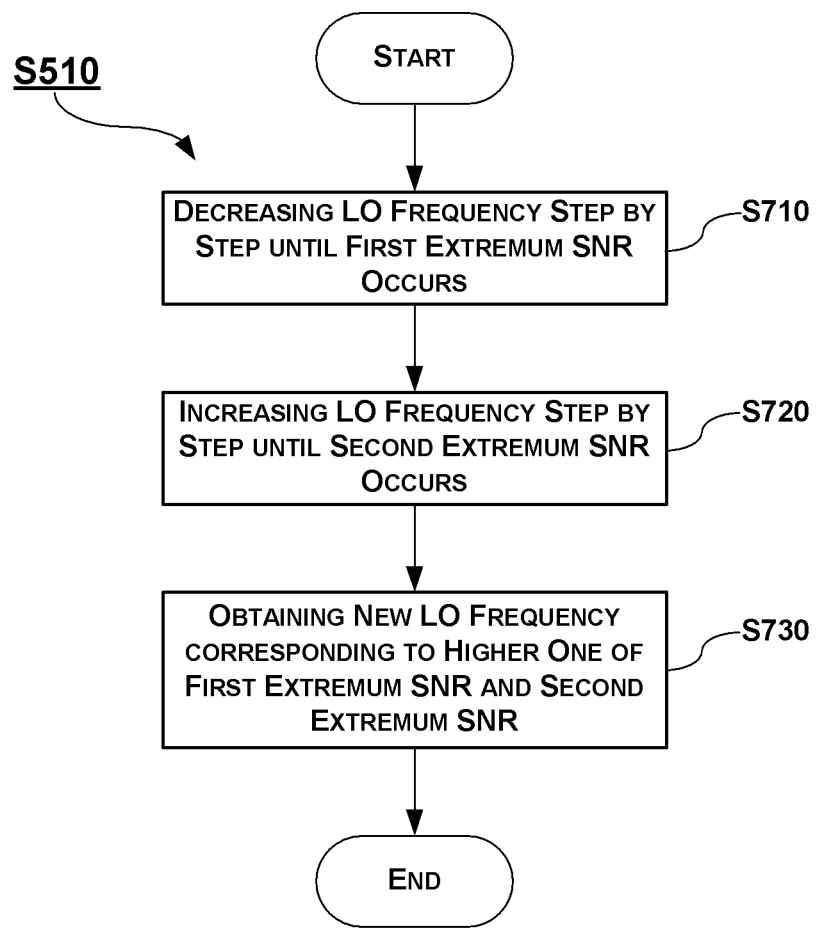

FIGS. 6 and 7 illustrate two feasible manners to implement step S510, respectively. As shown in FIG. 6, a feasible manner to implement step S510 includes: performing FFT on the one or more symbols to obtain a power spectrum chart of the received signal (step S610); and obtaining the new LO frequency, at which a maximum SNR occurs, based on the power spectrum chart (step S620).

This manner is applied when a baseband processor of the receiver is able to figure out positions and power levels of in-band interferences. In this case, a best position of LO which can achieve the best SNR performance may be calculated by using a simple existing algorithm. Then, the LO may be set to the target position at once.

Referring to FIG. 7, another feasible manner to implement step S510 is to:

within a search window:
    decrease the LO frequency step by step until a first extremum SNR occurs (step S710);
    increase the LO frequency step by step until a second extremum SNR occurs (step S720); and
    obtain the new LO frequency corresponding to the higher one of the first extremum SNR and the second extremum SNR (step S730).

As an example, the search window may be defined in such a manner that

|a frequency of the received signal−the LO frequency|
∈a maximum available reception bandwidth One major advantage with the LO frequency adjusting scheme is to reduce in-band interference while improving the receiver performance.

Return to FIG. 5. In one implementation, before step S520, the method 500 may further include the following optional steps: detecting power levels of one or more interferences in the received signal during a predefined time period (step S530); and comparing the detected power levels with a first predefined threshold (step S540). In this case, if the detected power levels are all higher than the first predefined threshold, the LO frequency is adjusted into the new LO frequency.

In such an implementation, before step S520, the method may further include comparing the detected power levels with a second predefined threshold (not shown). The second predefined threshold is lower than the first predefined threshold. In this case, if the detected power levels are all lower than the second predefined threshold, the LO frequency is adjusted to an initial value. Here, the initial value refers to a default LO frequency, which may be, e.g., preset or pre-configured.

That is, according to the present disclosure, it is to define a precondition to trigger LO shifting control, so as to minimize too quick and unnecessary shifting actions. The precondition may be a single value or complex judgment logics.

Figure 8:
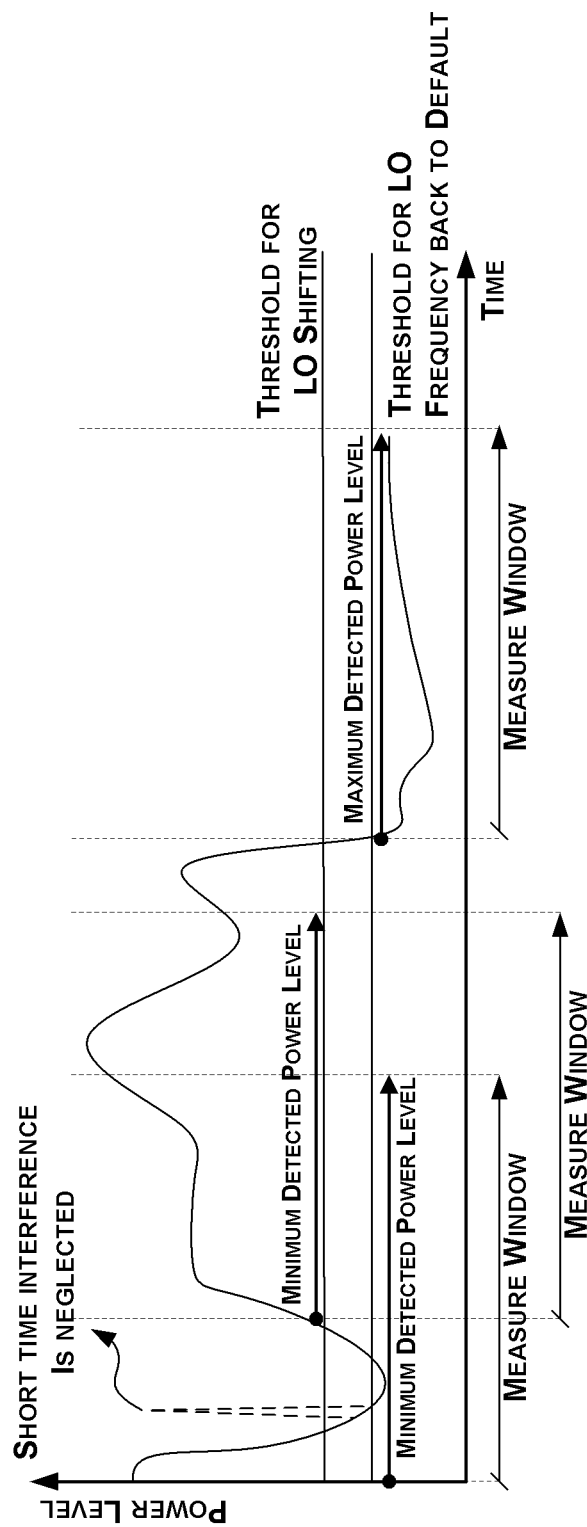
FIG. 8 illustrates exemplary judgment logics with different thresholds for triggering LO shifting control according to some embodiments of the present disclosure.

FIG. 8 illustrates exemplary judgment logics with different thresholds for triggering LO shifting control according to some embodiments of the present disclosure.

As shown in FIG. 8, for example, in a certain time period (i.e., a predefined measure window), continuous interferences exceeding certain pre-defined power level threshold will trigger LO shifting control, and only short time interferences will not trigger LO shifting control. Also, based on statistic date in a certain time period, if the sparkle interference appears in the same frequency from time to time, the LO can be still moved to attenuate the interference. If continuous interferences are always lower than a certain pre-defined power level threshold, a LO frequency may be adjusted back to an initial value, such as a default LO frequency.

Figure 9:
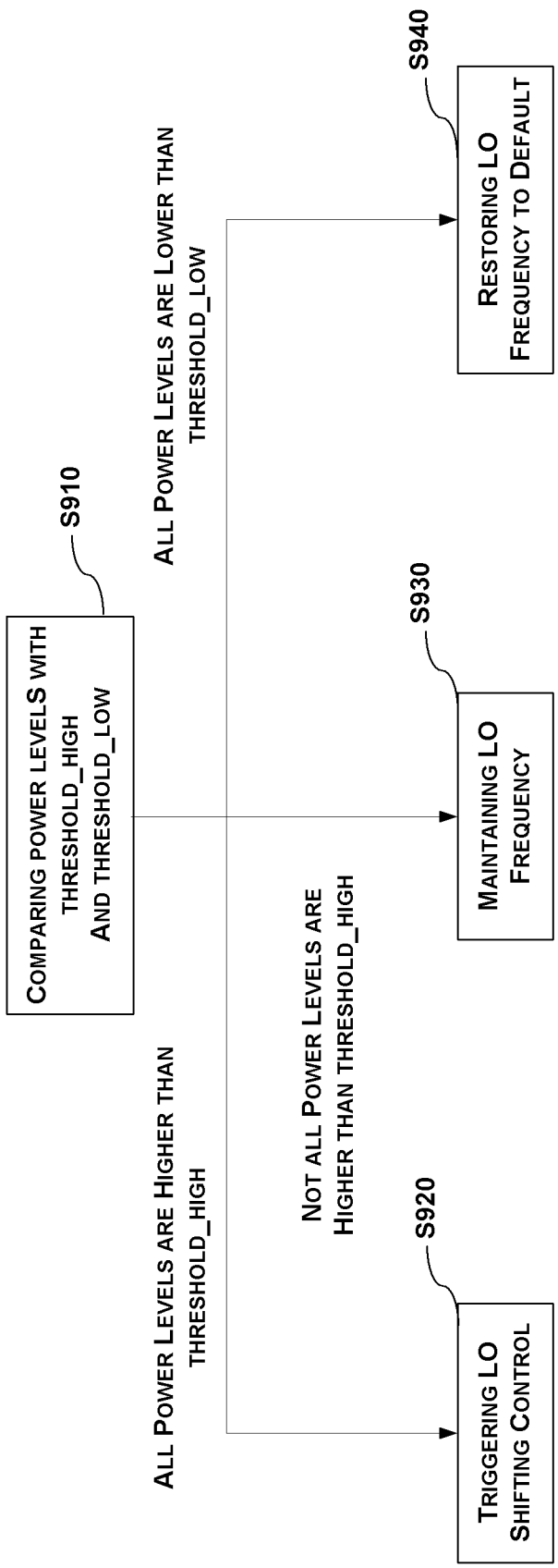
FIG. 9 illustrates a procedure for triggering LO shifting control according to some embodiments of the present disclosure.

FIG. 9 illustrates a procedure for triggering LO shifting control according to some embodiments of the present disclosure.

As shown in FIG. 9, the procedure is depicted as starting at step S910 of comparing power levels of interferences, e.g., detected at step S530, with a first predefined threshold, denoted as threshold_high, and a second predefined threshold, denoted as threshold_low. The first predefined threshold is larger than the second predefined threshold.

At step S920, when all detected power levels of interferences are higher than threshold_high, the LO shifting control is triggered. That is, the LO frequency may be adjusted into a new LO frequency, which may be, e.g., estimated at step S510.

At step S930, if not all detected power levels of interferences are higher than threshold_high, the LO frequency is maintained.

At step S940, when all detected power levels of interferences are lower than threshold_low, the LO frequency is restored (or adjusted) to an initial value. Here, the initial value refers to a default LO frequency, which may be, e.g., preset or pre-configured.

Herein, threshold_high and threshold_low may correspond to "threshold for LO shifting" and "threshold for LO frequency back to default" as shown in FIG. 8, respectively.

With such a procedure, the present disclosure can avoid too quick and unnecessary LO shifting, thereby reducing extra time for re-establishing LO.

In the following, several strategies for LO shifting control according to the present disclosure will be described in conjunction with the single down conversion heterodyne receiver and the double down conversion heterodyne receiver as shown in FIGS. 4a and 4b, respectively.

EXAMPLE 1

Figure 10A:
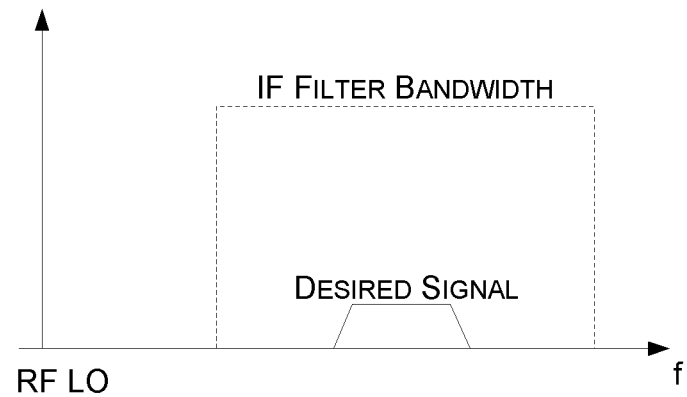
FIGS. 10a and 10b illustrate LO allocations without interferences at both sides of desired channel in the single down conversion heterodyne receiver and the double down conversion heterodyne receiver, respectively.
Figure 10B:
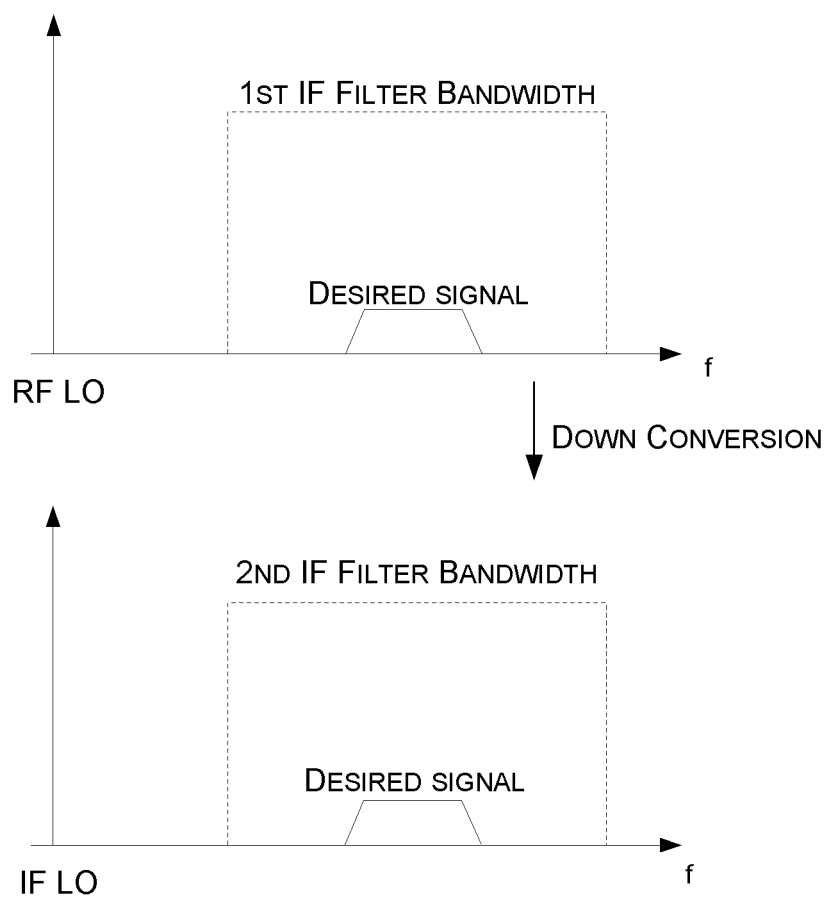

FIGS. 10a and 10b illustrate LO allocations without interferences at both sides of desired channel in the single down conversion heterodyne receiver and the double down conversion heterodyne receiver, respectively.

As shown in FIGS. 10a and 10b, when there is no strong interference, the LO frequency should be selected in such a manner that the desired UL carrier channel (i.e., the desired signal) should be in the middle of an IF filter bandwidth, so as to get linear amplitude and phase, thereby obtaining a better signal quality.

EXAMPLE 2

Figure 11A:
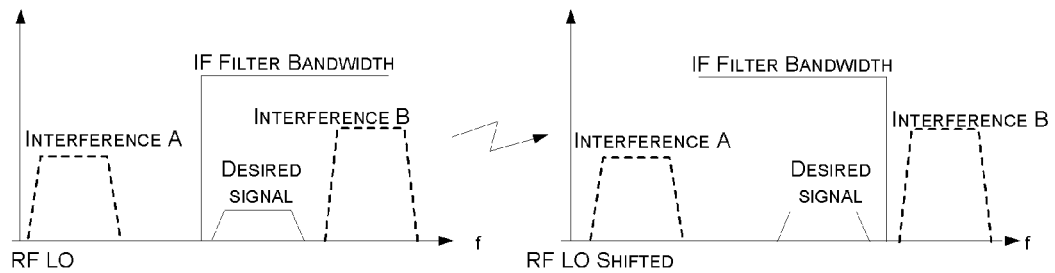
FIGS. 11a and 11b respectively illustrate one exemplary best scenario of LO shifting allocation to attenuate interference in the single down conversion heterodyne receiver and the double down conversion heterodyne receiver, respectively.
Figure 11B:
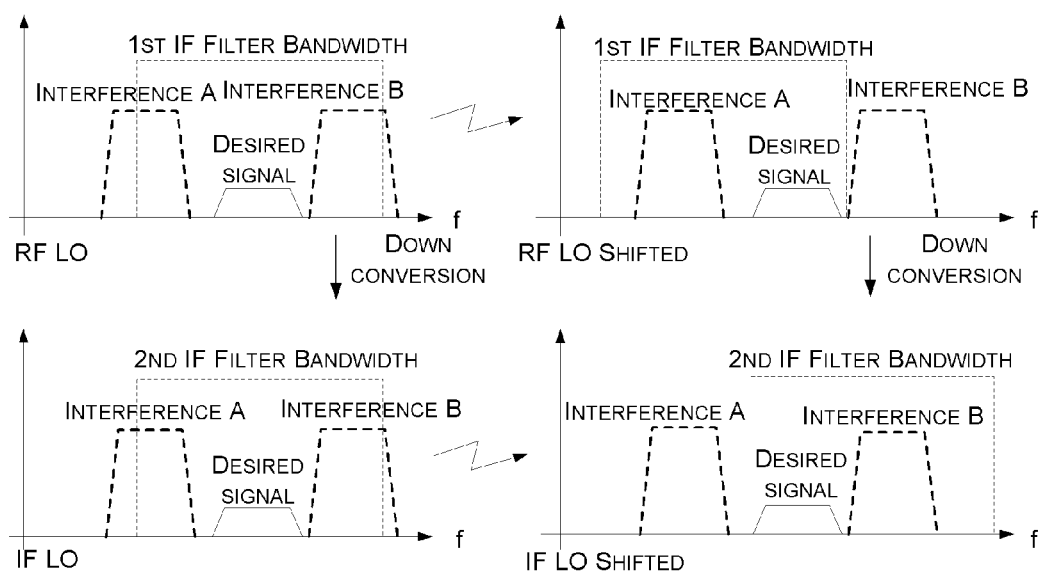

FIGS. 11a and 11b respectively illustrate one exemplary best scenario of LO shifting allocation to attenuate interferences in the single down conversion heterodyne receiver and the double down conversion heterodyne receiver, respectively.

When there are strong interferences close to the desired UL carrier channel (i.e., the desired signal), the strategy may be to move the filter(s) to a proper position to achieve the best optimized SNR performance. As shown in FIGS. 11a and 11b, two interferences A and B can be suppressed by such a strategy.

EXAMPLE 3

Figure 12A:
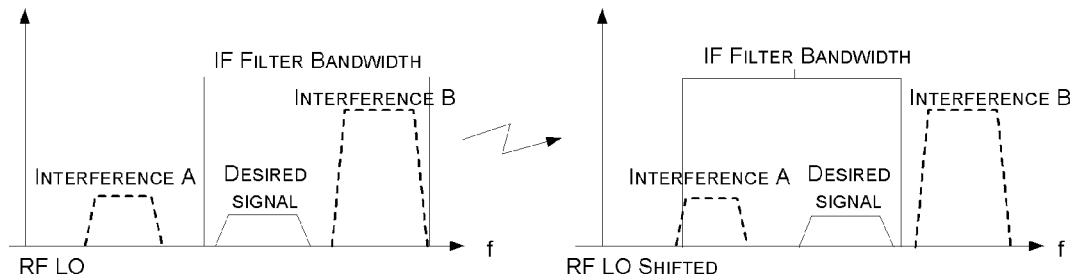
FIGS. 12a and 12b depict another exemplary best scenario of LO shifting allocation to attenuate interference in the single down conversion heterodyne receiver and the double down conversion heterodyne receiver, respectively.
Figure 12B:
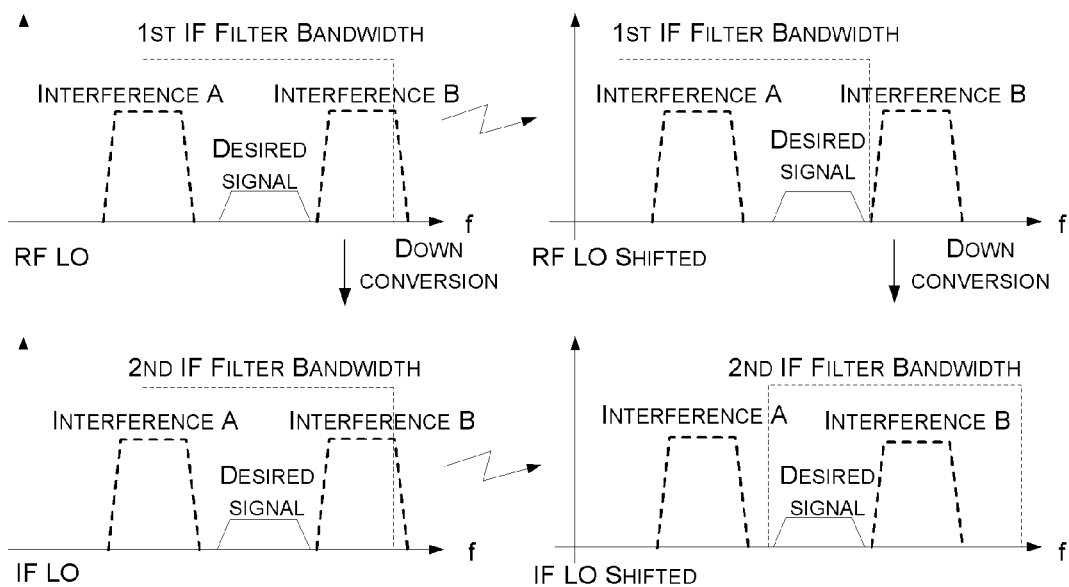

FIGS. 12a and 12b depict another exemplary best scenario of LO shifting allocation to attenuate interferences in the single down conversion heterodyne receiver and the double down conversion heterodyne receiver, respectively.

As shown in FIGS. 12a and 12b, two interferences A and B have closer frequency distinction, and there is no way to remove the both interferences in one step of shifting. For the single down conversion heterodyne receiver, as shown in FIG. 12a, it is evident that interference B is larger than interference A and interference B is included in an IF filter bandwidth of the receiver. In view of this, the strategy is to shift RF LO to remove interference B while partly including interference A within an IF filter bandwidth of the receiver. Thereby, only suboptimum suppression result can be achieved.

For the double down conversion heterodyne receiver, as shown in FIG. 12b, RF LO may be shifted firstly to remove interference A, and then IF LO may be shifted to remove interference B. In this way, the both interferences may be removed.

EXAMPLE 4

Figure 13A:
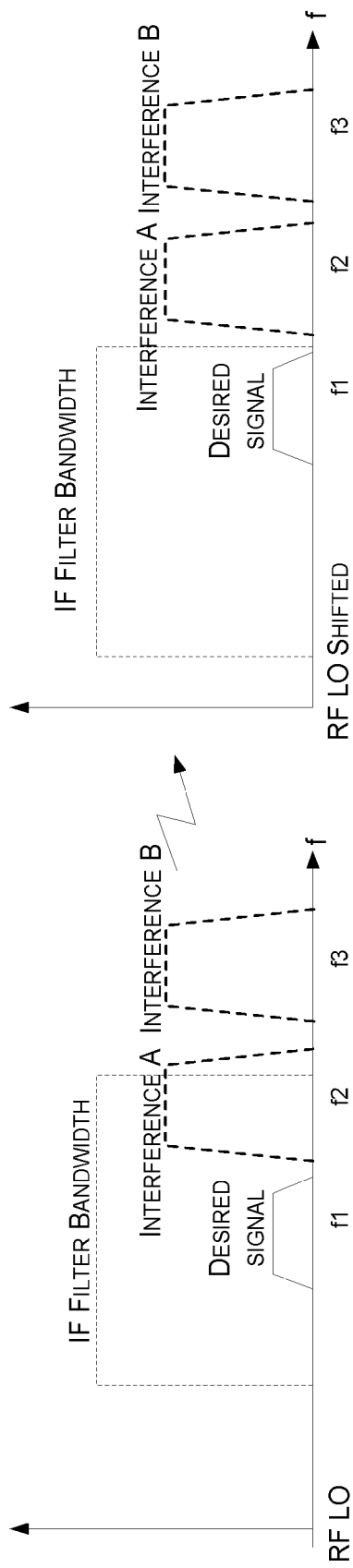
FIGS. 13a and 13b illustrate a further exemplary best scenario of LO shifting allocation to attenuate IP3 of desired channel in the single down conversion heterodyne receiver and the double down conversion heterodyne receiver, respectively.
Figure 13B:
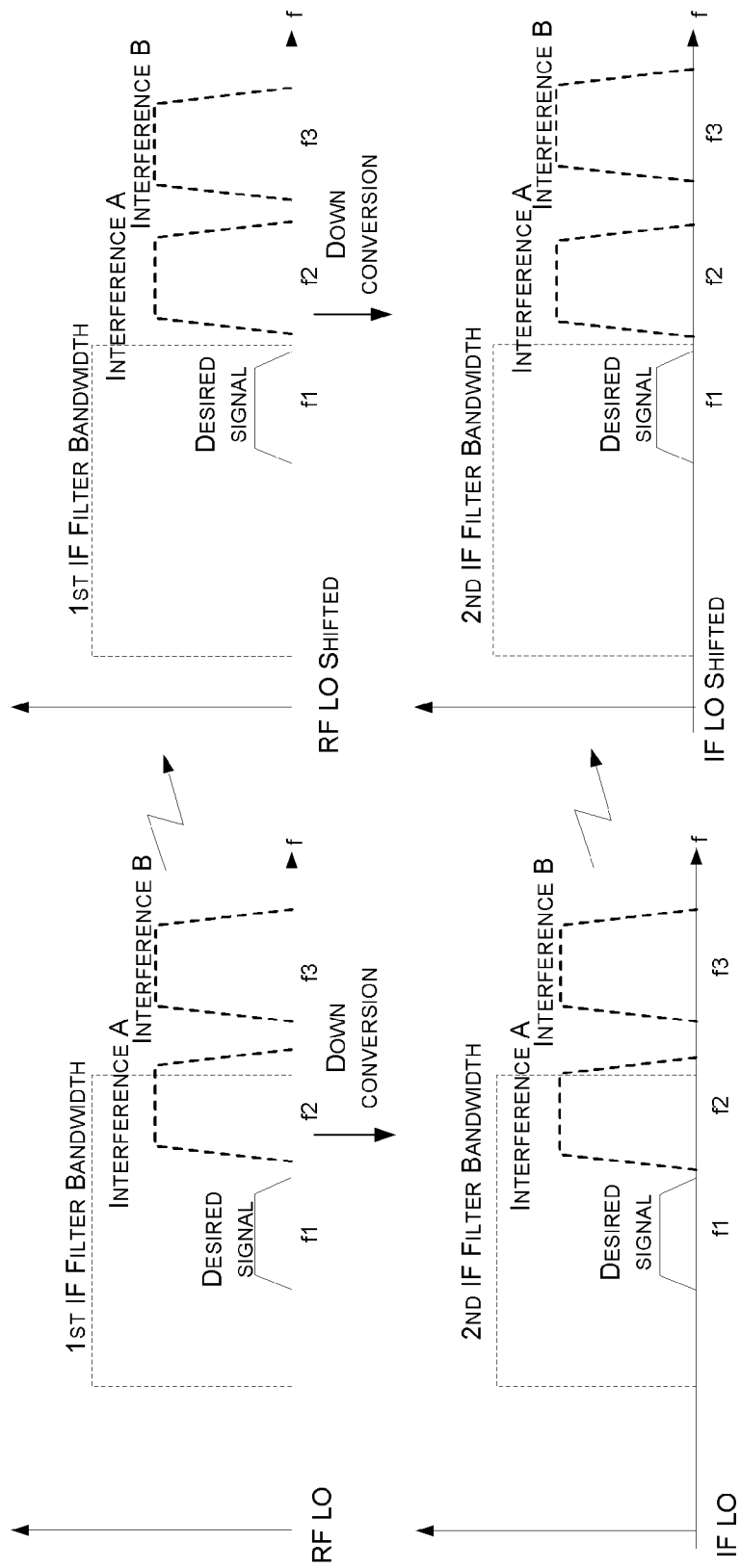

FIGS. 13a and 13b illustrate a further exemplary best scenario of LO shifting allocation to attenuate IP3 of desired channel in the single down conversion heterodyne receiver and the double down conversion heterodyne receiver, respectively. Assume that an IP3 product is generated by interference B at f3 and interference A at f2 and falls into the desired signal at f1, where f3−f2=f2−f1.

As shown in FIGS. 13a and 13b, the strategy may be also to move the filter(s) to a proper position to achieve the best optimized SNR performance.

Figure 14:
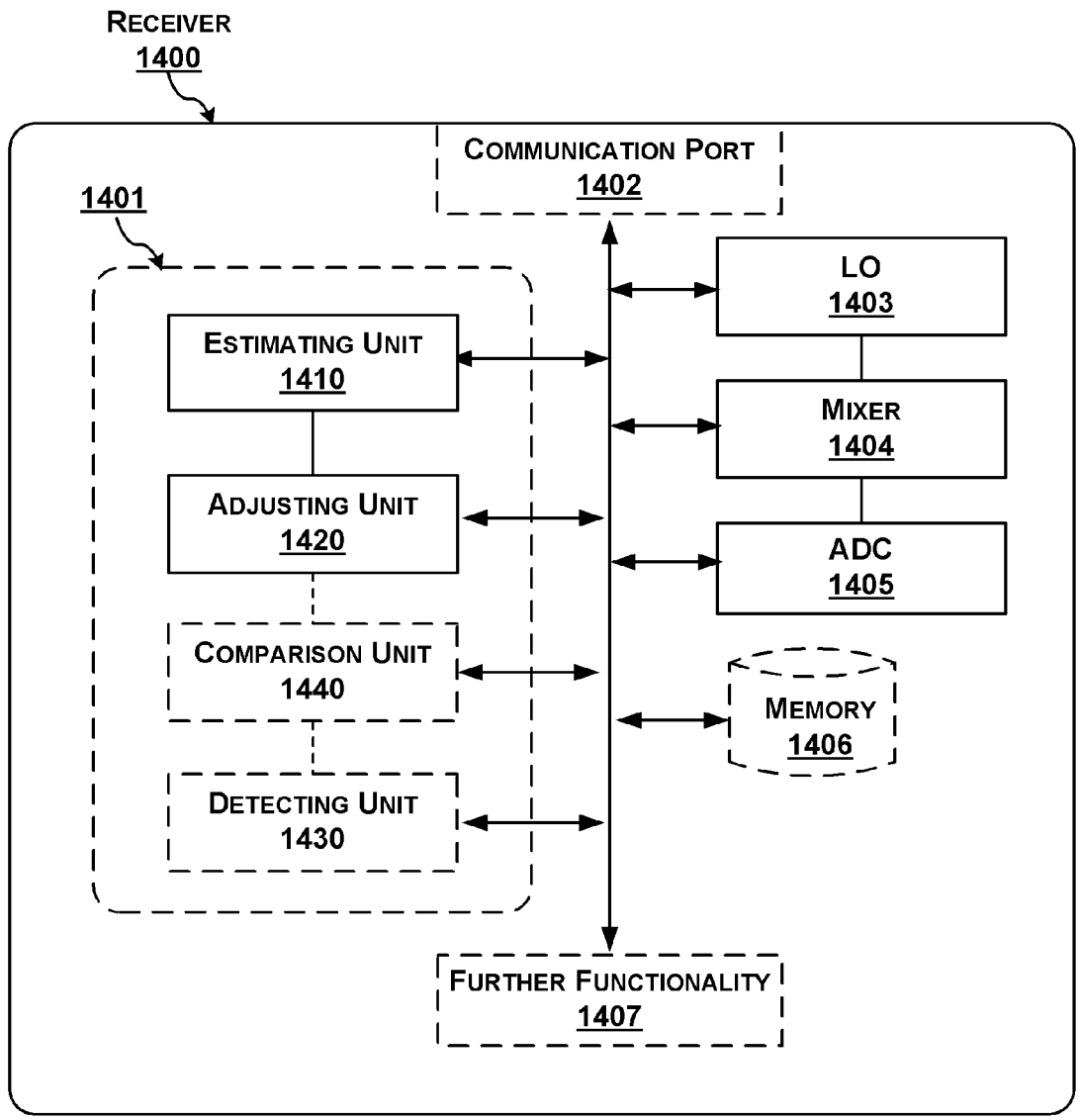
FIG. 14 is a schematic block diagram of a receiver 1400 for adjusting one or more LO frequencies according to some embodiments of the present disclosure.

FIG. 14 is a schematic block diagram of a receiver 1400 for adjusting one or more LO frequencies according to some embodiments of the present disclosure.

The part of the receiver 1400 which is most affected by the adaptation to the herein described method, e.g., the method 500, is illustrated as an arrangement 1401, surrounded by a dashed line. The receiver 1400 could be e.g. a UE such as a mobile terminal or a base station such as a "NodeB" (UMTS) or "eNodeB (eNB)" (LTE), depending on in which type of communication system it is operable, e.g., LTE-type systems. The receiver 1400 and arrangement 1401 are further configured to communicate with other entities via a communication port 1402 which may be regarded as part of the arrangement 1401. The communication port 1402 comprises means for wireless communication, such as an antenna. The arrangement 1401 or receiver 1400 may further comprise one or more LOs 1403, one or more mixers 1404 for performing down conversion on a received signal by using the one or more LO frequencies, and an ADC 1405 for outputting one or more symbols. The arrangement 1401 or receiver 1400 may further other functional units 1407, such as functional units providing regular receiver functions, and may further comprise one or more storage units or memories 1406 for storing computer program code and other information thereon.

The arrangement 1401 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 5. The arrangement part of the receiver 1400 may be implemented and/or described as follows.

Referring to FIG. 14, the receiver 1400 may include an estimating unit 1410 and an adjusting unit 1420.

The estimating unit 1410 may estimate, for each of the one or more LO frequencies, a new LO frequency corresponding to a best signal quality of the received signal. For example, the best signal quality is indicated by a maximum SNR of the received signal. Alternatively, the best signal quality may be also indicated by SINAD, bit error rate, or BER. The adjusting unit 1420 may adjust the LO frequency into the new LO frequency.

In an implementation, the receiver 1400 may optionally include a detecting unit 1430 and a comparison unit 1440. The detecting unit 1430 may detect power levels of one or more interferences in the received signal during a predefined time period. The comparison unit 1440 may compare the detected power levels with a first predefined threshold. If the detected power levels are all higher than the first predefined threshold, the adjusting unit 1420 may adjust the LO frequency into the new LO frequency.

Alternatively, the comparison unit 1440 may further compare the detected power levels with a second predefined threshold. The second predefined threshold is lower than the first predefined threshold. In this case, if the detected power levels are all lower than the second predefined threshold, the adjusting unit 1420 may adjust the LO frequency to an initial value. Here, the initial value refers to a default LO frequency, which may be, e.g., preset or pre-configured.

In another implementation, the estimating unit 1410 may perform FFT on the one or more symbols to obtain a power spectrum chart of the received signal, and obtain the new LO frequency, at which a maximum SNR occurs, based on the power spectrum chart.

In a further implementation, the estimating unit 1410 may, within a search window, decrease the LO frequency step by step until a first extremum SNR occurs, increase the LO frequency step by step until a second extremum SNR occurs, and obtain the new LO frequency corresponding to the higher one of the first extremum SNR and the second extremum SNR.

It should be noted that two or more different units in this disclosure may be logically or physically combined. For example, the adjusting unit 1420 and the comparison unit 1440 may be combined as one single unit.

Figure 15:
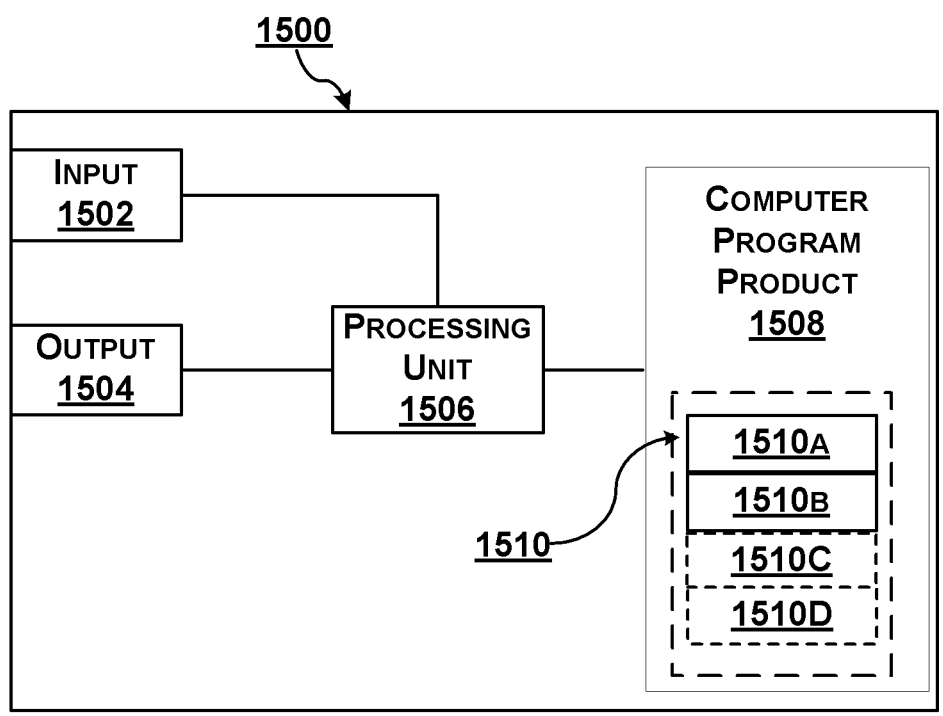
FIG. 15 schematically shows an embodiment of an arrangement 1500 which may be used in the receiver 1400.

FIG. 15 schematically shows an embodiment of an arrangement 1500 which may be used in the receiver 1400. Comprised in the arrangement 1500 are here a processing unit 1506, e.g., with a Digital Signal Processor (DSP). The processing unit 1506 may be a single unit or a plurality of units to perform different actions of procedures described herein. The arrangement 1500 may also comprise an input unit 1502 for receiving signals from other entities, and an output unit 1504 for providing signal(s) to other entities. The input unit and the output unit may be arranged as an integrated entity or as illustrated in the example of FIG. 14.

Furthermore, the arrangement 1500 comprises at least one computer program product (or computer-readable storage medium) 1508 in the form of a non-volatile or volatile memory, e.g., an Electrically Erasable Programmable Read-Only Memory (EEPROM), a flash memory and a hard drive. The computer program product 1508 comprises a computer program 1510, which comprises code/computer readable instructions, which when executed by the processing unit 1506 in the arrangement 1500 cause the arrangement 1500 and/or the receiver in which it is comprised to perform the actions, e.g., of the procedure described earlier in conjunction with FIG. 5.

The computer program 1510 may be configured as a computer program code structured in computer program modules 1510A, 1510B, 1510C, and 1510D. The computer program modules 1510C and 1510D are optional.

Hence, in an exemplifying embodiment when the arrangement 1500 is used in the receiver 1400, the code in the computer program of the arrangement 1500 includes an estimating module 1510A, for estimating, for each of the one or more LO frequencies, a new LO frequency corresponding to a best signal quality of the received signal. The code in the computer program 1510 further includes an adjusting module 1510B, for adjusting the LO frequency into the new LO frequency. The code in the computer program 1510 further includes a detecting module 1510C, for detecting power levels of one or more interferences in the received signal during a predefined time period. The code in the computer program 1510 further includes a comparing module 1510D, for comparing the detected power levels with a first predefined threshold. If the detected power levels are all higher than the first predefined threshold, the adjusting module 1510B adjusts the LO frequency into the new LO frequency.

The computer program modules could essentially perform the actions of the flow illustrated in FIG. 5, to emulate the arrangement 1401 in the receiver 1400. In other words, when the different computer program modules are executed in the processing unit 1506, they may correspond, e.g., to the units 1410-1440 of FIG. 14.

Although the code means in the embodiments disclosed above in conjunction with FIG. 15 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor.

The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the receiver.

Although the present technology has been described above with reference to specific embodiments, it is not intended to be limited to the specific form set forth herein. For example, the embodiments presented herein are not limited to a heterodyne receiver; rather they are equally applicable to other appropriate radio receivers. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method for adjusting one or more Local Oscillator (LO) frequencies in a receiver, the receiver performing down conversion on a received signal through one or more mixers by using the one or more LO frequencies, and outputting one or more symbols through an Analog-to-Digital Converter (ADC) the method comprising the steps of:
for each of the one or more LO frequencies:
estimating a new LO frequency corresponding to a best signal quality of the received signal; and
adjusting the LO frequency into the new LO frequency,
wherein the method further comprises, before the step of adjusting the LO frequency into the new LO frequency:
detecting power levels of one or more interferences in the received signal during a predefined time period; and
comparing the detected power levels with a first predefined threshold, wherein if the detected power levels are all higher than the first predefined threshold, the LO frequency is adjusted into the new LO frequency.

2. The method of claim 1, wherein the method further comprises, before the step of adjusting the LO frequency into the new LO frequency:

comparing the detected power levels with a second predefined threshold, the second predefined threshold being lower than the first predefined threshold, wherein if the detected power levels are all lower than the second predefined threshold, the LO frequency is adjusted to an initial value.

3. The method of claim 1, wherein, the best signal quality is indicated by a maximum Signal Noise Ratio (SNR) of the received signal.

4. The method of claim 1, wherein, the step of estimating the new LO frequency comprises:

performing Fast Fourier Transform (FFT) on the one or more symbols to obtain a power spectrum chart of the received signal; and obtaining the new LO frequency, at which a maximum Signal Noise Ratio (SNR) occurs, based on the power spectrum chart.

5. The method of claim 1, wherein, the step of estimating the new LO frequency comprises:

within a search window:

decreasing the LO frequency step by step until a first extremum SNR occurs;

increasing the LO frequency step by step until a second extremum SNR occurs; and obtaining the new LO frequency corresponding to the higher one of the first extremum SNR and the second extremum SNR.

6. A receiver, comprising:

one or more mixers configured to perform down conversion on a received signal by using one or more Local Oscillators (LO) frequencies;

an Analog-to-Digital Converter (ADC) configured to output one or more symbols; and a processing circuit comprising a processor and a memory containing instructions that, when executed by said processor, cause said receiver to, for each of the one or more LO frequencies, estimate a new LO frequency corresponding to a best signal quality of the received signal, and adjust the LO frequency into the new LO frequency, wherein the processing circuit is further configured to:

detect power levels of one or more interferences in the received signal during a predefined time period;

compare the detected power levels with a first predefined threshold; and, if the detected power levels are all higher than the first predefined threshold, adjust the LO frequency into the new LO frequency.

7. The receiver of claim 6, wherein the processing circuit is further configured to compare the detected power levels with a second predefined threshold, the second predefined threshold being lower than the first predefined threshold, and, if the detected power levels are all lower than the second predefined threshold, adjust the LO frequency to an initial value.

8. The receiver of claim 6, wherein the processing circuit is configured to:

perform Fast Fourier Transform, FFT, on the one or more symbols to obtain a power spectrum chart of the received signal; and obtain the new LO frequency, at which a maximum SNR occurs, based on the power spectrum chart.

9. The receiver of claim 6, wherein the processing circuit is configured to, within a search window:

decrease the LO frequency step by step until a first extremum SNR occurs;

increase the LO frequency step by step until a second extremum SNR occurs; and obtain the new LO frequency corresponding to the higher one of the first extremum SNR and the second extremum SNR.

10. The receiver of claim 6, wherein the receiver is a base station or a user equipment.

* * * * *